United States Patent
Andersson et al.

(10) Patent No.: US 7,195,803 B2
(45) Date of Patent: Mar. 27, 2007

(54) PACKAGING LAMINATE FOR A RETORTABLE PACKAGING CONTAINER

(75) Inventors: Thorbjörn Andersson, Södra Sandby (SE); Tom Kjelgaard, Lund (SE); Ib Leth, Kävlinge (SE)

(73) Assignee: Tetra Laval Holdings & Finance S.A., Pully (CH)

( * ) Notice: Subject to any disclaimer, the term of this patent is extended or adjusted under 35 U.S.C. 154(b) by 290 days.

(21) Appl. No.: 10/380,877

(22) PCT Filed: Oct. 1, 2001

(86) PCT No.: PCT/SE01/02122

§ 371 (c)(1),
(2), (4) Date: Jun. 27, 2003

(87) PCT Pub. No.: WO02/28637

PCT Pub. Date: Apr. 11, 2002

(65) Prior Publication Data

US 2004/0023045 A1    Feb. 5, 2004

(30) Foreign Application Priority Data

Oct. 3, 2000    (SE) .................................... 0003554

(51) Int. Cl.
*B32B 32/06*    (2006.01)
(52) U.S. Cl. ............... 428/34.2; 428/36.6; 428/36.7; 428/461; 428/464; 428/507; 428/510

(58) Field of Classification Search ............... 428/461, 428/36.6, 36.7, 510, 464, 34.2, 507
See application file for complete search history.

(56) References Cited

U.S. PATENT DOCUMENTS

| | | |
|---|---|---|
| 3,941,643 A | 3/1976 | Balla |
| 3,985,604 A | 10/1976 | Balla |
| 4,133,710 A | 1/1979 | Wartenberg |
| 4,264,668 A | 4/1981 | Balla |
| 4,424,260 A | 1/1984 | Pupp |

(Continued)

FOREIGN PATENT DOCUMENTS

EP    0158533 A2    10/1985

(Continued)

*Primary Examiner*—D. Lawrence Tarazano
(74) *Attorney, Agent, or Firm*—Buchanan, Ingersoll & Rooney PC

(57) ABSTRACT

The disclosure relates to a packaging laminate for a retortable packaging container comprising a core layer (11), outer, liquid-tight coatings (12 and 13) and a gas barrier (14) disposed between the one coating (12) and the core layer (11). Between the gas barrier (14) and the core layer (11), there is a layer (16) of a lamination or sealing agent of such a nature that the lamination or sealing agent has a melting point which is higher than the maximum temperature to which the retortable packaging container is to be subjected during a normal heat treatment in a retort. The lamination or sealing agent in the layer (16) may, for example, be a polypropylene with a melting point of above 130° C.

8 Claims, 1 Drawing Sheet

U.S. PATENT DOCUMENTS

| | | | |
|---|---|---|---|
| 4,461,667 A | 7/1984 | Pupp | |
| 4,590,126 A | 5/1986 | Andersson | |
| 4,657,614 A | 4/1987 | Andersson | |
| 4,720,425 A | 1/1988 | Hattori et al. | |
| 4,986,053 A * | 1/1991 | Schaefer | 53/401 |
| 5,089,308 A | 2/1992 | Nordness et al. | |
| 5,162,066 A | 11/1992 | Martensson et al. | |
| 5,223,194 A | 6/1993 | Rosén | |
| 5,413,845 A | 5/1995 | Löfgren et al. | |
| 5,489,472 A | 2/1996 | Andersson | |
| 5,520,970 A | 5/1996 | Christensson et al. | |
| 5,527,622 A * | 6/1996 | Kato et al. | 428/481 |
| 5,683,534 A | 11/1997 | Löfgren et al. | |
| 6,361,847 B1 | 3/2002 | Magnusson et al. | |
| 6,368,686 B1 | 4/2002 | Löfgren et al. | |
| 6,703,134 B1 * | 3/2004 | Parr et al. | 428/461 |
| 2005/0008800 A1 * | 1/2005 | Andersson et al. | 428/34.2 |
| 2006/0233980 A1 * | 10/2006 | Andersson et al. | 428/34.2 |

FOREIGN PATENT DOCUMENTS

| | | |
|---|---|---|
| EP | 0331072 A2 | 9/1989 |
| EP | 0459357 A2 | 12/1991 |
| WO | WO96/12616 | 5/1996 |
| WO | WO 97/02140 A1 | 1/1997 |
| WO | WO 98/16431 A1 | 4/1998 |

* cited by examiner ns skilled in the art and relate to the time (mm) which the food would need to be heated at a reference temperature (121° C.) in order to achieve the same level of sterility, and the time the food would need to be heated at a reference temperature (100° C.) in order to achieve the same level of cooking effect on all of the component ingredients in the food, respectively. To a person skilled in the art, it will be obvious that a higher treatment temperature in the retorting process gives a higher Fo-value and a lower Co-value than a lower treatment temperature in a corresponding retorting during the same total treatment time, and that a retorting of the packed food consequently should be carried out at a relatively high treatment temperature within the range of 70–90° C. in order to achieve the desired combination of high Fo-value and low Co-value.

PACKAGING LAMINATE FOR A RETORTABLE PACKAGING CONTAINER

FIELD OF THE INVENTION

The present invention relates to a packaging laminate for a retortable packaging container or carton comprising a core layer, outer, liquid-tight coatings and a gas barrier disposed between the core layer and the one outer coating. The present invention also relates to a retortable packaging container or carton of the packaging laminate.

BACKGROUND OF THE INVENTION

A packaging laminate of the above-described type is previously known from, for example, international patent application carrying publication number WO 97/02140. The known packaging laminate has a rigid, but foldable core layer of paper or paperboard and outer, liquid-tight coatings of humidity and heat-resistant thermoplastic material on both sides of the core layer. In order to impart to the known packaging laminate tightness properties also against gases, in particular oxygen gas, the packaging laminate moreover has a gas barrier, for example an aluminium foil (Alifoil) disposed between the core layer and the one outer coating.

From the known packaging laminate, retortable packaging containers or cartons are produced with the aid of filling machines of the type which, from a web or from prefabricated blanks of the packaging laminate, form, fill and seal finished packages according to the so-called form/fill/seal technology.

From, for example, a flat-folded tubular packaging blank of the known packaging laminate, retortable packaging containers are produced in that the packaging blank is first raised to an open, tubular packaging carton which is sealed at its one end by fold-forming and sealing of the continuous, united foldable end panels of the packaging carton, for the formation of a substantially planar bottom closure. The packaging carton provided with the bottom is filled with the relevant contents, e.g. a food, through its open end which is thereafter closed by a further fold-forming and sealing of the opposing end panels of the packaging carton for the formation of a substantially planar top closure. The filled and sealed, normally parallelepipedic packaging container is thereafter ready for heat treatment in order to impart to the packed food extended shelf life in the unopened packaging container.

A shelf life extending heat treatment of the packed food may suitably be put into effect in the manner and under the conditions described more closely in international patent application carrying publication number WO 98/16431, which is hereby embodied as a reference. The packaging container is placed in a retort and heated therein with the aid of a first circulating gaseous medium, e.g. hot steam, to a temperature which in general lies in the range of between 70 and 130° C. After a predetermined stay time at this selected temperature, the supply of the first gaseous medium is discontinued. The packaging container is thereafter cooled with a second circulating gaseous medium, e.g. cold air, and finally with a circulating liquid medium, e.g. cold water. The cooled packaging container is thereafter removed from the retort for further transport and handling. The total treatment time, including the time for heating and the time for cooling from the selected treatment temperature should be sufficient to give, in each individual case, the relevant food a desired combination of high Fo-value and low Co-value. The expressions "Fo-value" and "Co-value" are known to per- A packaging container of the known packaging laminate generally functions well in a normal heat treatment in a retort, but, on the other hand, problems may not seldom arise in such cases when the heat treatment is carried out at an extremely high treatment temperature within the range of 70–130° C. and/or during an extremely long treatment time, even at a relatively low treatment temperature within this range. For example, it has proved that the internal bonding strength between the layers included in the packaging laminate have a tendency to become weakened, and that this weakening may even be so great that the packaging laminate, at excessively high treatment temperatures, delaminates, whereby the packaging container loses both its mechanical strength and configurational stability, as well as its desired tightness properties.

SUMMARY OF THE INVENTION

One object of the present invention is therefore to obviate the above-discussed problems in connection with the prior art packaging laminate.

A further object of the present invention is to provide a packaging laminate of the type described by way of introduction for a packaging container which may be heat treated in a retort, without risk of delamination and consequential loss of mechanical strength and configurational stability, as well as lost tightness properties.

Yet a further object of the present invention is to provide a packaging container produced from the packaging laminate which, with retained mechanical strength and configurational stability, and with retained tightness properties, may be heat treated in a retort even at extremely high humidity and temperature conditions.

These and other objects and advantages will be attained according to the present invention by a packaging laminate according to independent claim 1 and a retortable packaging container or carton according to independent claim 10.

The present invention thus provides a packaging laminate for a retortable packaging container, comprising a core layer, outer, liquid-tight coatings on both sides of the core layer and a gas barrier disposed between the core layer and the one outer coating, the gas barrier being bonded to the core layer by a layer of a lamination or sealing agent which has a higher melting point than the treatment temperature to which the retortable packaging container is to be subjected during the heat treatment in a retort.

As was mentioned previously, a shelf life extending heat treatment is generally carried out at a treatment temperature within the range of 70–130° C. and during such a total treatment time that the packed food is given the desired combination of high Fo-value and low Co-value. The layer of lamination or sealing agent for bonding the gas barrier to the core layer in the packaging laminate according to the present invention should thus have a melting point of above 130° C. in order efficiently to eliminate the risk of delamination of the packaging laminate during normal heat treatment of the packaging laminate at an optional treatment temperature within the range of 70–130° C.

The present invention is not restricted to any particular type of lamination or sealing agent which, consequently, may be selected practically freely from among a multiplicity of various known agents in this area, on condition that the selected lamination or sealing agent has a melting point which is higher than the treatment temperature which, in each individual case, is selected for the retortable packaging container.

One example of a well-functioning sealing agent is polypropylene, preferably a polypropylene with a melting point of above 130° C.

The lamination or sealing agent between the core layer and the gas barrier in the packaging laminate according to the present invention may be applied in optional coating quantities, even though well-functioning practical coating quantities in general lie within the range of approx. 15 up to approx. 30 g/m$^2$, preferably approx. 20–25 g/m$^2$.

BRIEF DESCRIPTION OF THE DRAWINGS

The present invention will now be described and explained in greater detail hereinbelow, with reference to the accompanying Drawing, in which.

DETAILED DESCRIPTION OF THE INVENTION

Figure 1:
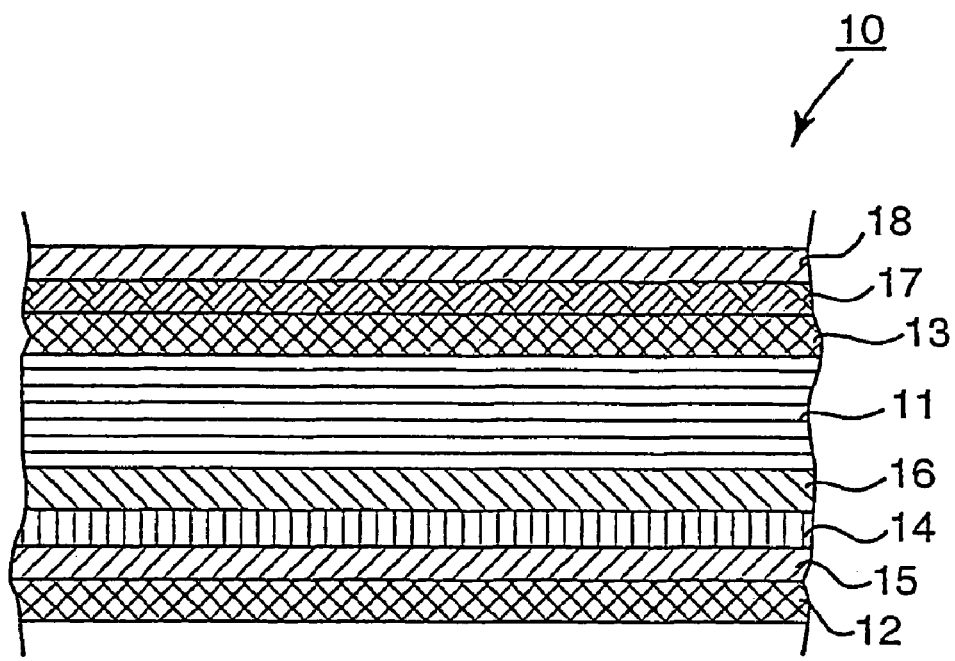
FIG. 1 shows a schematic cross section of a packaging laminate according to a first preferred embodiment of the present invention.

It should be observed that the present invention is not restricted to the specific preferred embodiments which are shown on the Drawing, and that numerous alterations and modifications of the packaging laminate and the retortable packaging container are obvious to a person skilled in the art without departing from the inventive concept as this is defined in the appended claims.

FIG. 1 thus shows a schematic cross section of the packaging laminate according to a first preferred embodiment of the present invention. The packaging laminate, carrying the generic reference numeral 10, has a core layer 11 and outer, liquid-tight coatings 12 and 13 on both sides of the core layer 11.

The packaging laminate 10 further has a gas barrier 14 between the core layer 11 and the one liquid-tight coating 12.

Between the liquid-tight coating 12 and the gas barrier 14, there is disposed a layer 15 of a binder or adhesive by means of which the liquid-tight coating 12 is partially, but reinforceably, bonded to the gas barrier 14, as will be explained in greater detail later in this description.

Between the gas barrier 14 and the core layer 11, there is disposed a layer 16 of lamination or sealing agent of such a nature that the gas barrier 14 is bonded to the core layer 11 with sufficiently strong and stable bonding strength in order not to be weakened or lost entirely when the packaging laminate 10 is subjected to extremely high thermal stresses, i.e. temperatures of up to approx. 130° C. or even higher.

The outer, liquid-tight coating 13 on the other side of the core layer 11 may carry decorative artwork 17 of suitable printing ink which in turn is protected by a transparent layer 18 of a suitable lacquer or other agent disposed above the decorative artwork 17 in order to protect the artwork 17 against outer harmful action.

The core layer 11 may consist of any suitably rigid but foldable material whatever, but preferably consists of paper or paperboard of conventional packaging quality.

The outer, liquid-tight coating 13 may be a plastic which is selected from among the group essentially comprising polyethylene (PE), polypropylene (PP) and polyester (PET), or mixtures thereof. Examples of a usable polyethylene plastic may be high density polyethylene (HDPE), or linear low density polyethylene (LLDPE), an example of a usable polypropylene plastic may be oriented polypropylene (OPP), and an example of a usable polyester plastic may be amorphous polyester (APET).

Preferably, the liquid-tight coating 13 consists of a physical or mechanical mixture of polypropylene (PP) and polyethylene (PE) which, in addition to superior tightness properties against liquid, also possesses sufficient humidity and heat resistance to withstand such extreme humidity and temperature stresses which occur in a normal shelf life extending heat treatment in a retort. An outer coating 13 of a physical or mechanical mixture of polypropylene (PP) and polyethylene (PE) moreover possesses good printability at the same time as making for mechanically strong and liquid-tight seals by so-called thermosealing, when the packaging laminate 10 is reformed into a packaging container for retorting purposes.

The thickness or quantity of the outer, liquid-tight coating 13 may vary, but in general is 25–45 g/m$^2$. Correspondingly, the outer, liquid-tight coating 12 may consist of a plastic which is selected from among the group essentially comprising polyethylene (PE), polypropylene (PP), polyester (PET), and copolymers thereof. Examples of a usable polyethylene plastic may be a high density polyethylene (HDPE), or a linear low density polyethylene (LLDPE), and an example of a usable polyester plastic may be amorphous polyester (APET).

Preferably, the liquid-tight coating 12 consists of a copolymer of propylene and ethylene which is sufficiently humidity and heat resistant to withstand extreme humidity and temperature stresses which occur in a normal shelf life extending heat treatment in a retort. A coating of a copolymer of propylene and ethylene moreover makes for mechanically strong and liquid-tight seals when the packaging laminate 10 is reformed into packaging containers for retorting purposes.

The thickness or quantity of the outer plastic coating 12 may vary, but in general is 25–35 g/m$^2$.

The layer 14 serving as gas barrier may consist of an inorganic or an organic material. Examples of a usable inorganic material may be a metal foil, e.g. an aluminium foil, or a coating, produced by plasma deposition, of silica oxide, and examples of a suitable organic material may be a so-called barrier polymer, e.g. a copolymer of ethylene and vinyl alcohol (EVOH).

Preferably, the gas barrier 14 is an aluminium foil (Alifoil) which, in addition to superior tightness properties against gases, in particular oxygen gas, also makes for sealing of the packaging laminate 10 by induction thermosealing which is a simple, but rapid and efficient sealing technology.

While a packaging container of the prior art packaging laminate, as was previously mentioned, not seldom loses mechanical strength and configurational stability as well as other desired properties in an extreme heat treatment in a retort, this problem may be obviated with the aid of the packaging laminate 10 according to the present invention by a suitable selection of lamination or sealing layer 16 between the gas barrier 14 and the core layer 11. In particular, it has proved that a layer 16 of a lamination or sealing agent with a melting point which is higher than the treatment temperatures normally employed in connection with such a heat treatment effectively eliminates every risk of weakened bonding strength and later delamination between these two layers, even when the treatment is carried out at an extremely elevated treatment temperature and/or during an excessively long treatment time in a retort. The layer 16 between the gas barrier 14 and the core layer 11 therefore preferably consists of a lamination or sealing agent with a melting point of above 130° C.

An example of a well-functioning lamination or sealing agent for the layer 16 is polypropylene, preferably a polypropylene with a melting point of above 130° C.

The thickness or coating quantity of the lamination or sealing layer 16 may vary, but generally lies within the range of approx. 15 up to approx. 30 g/m$^2$, preferably approx. 20–25 g/m$^2$.

In order to avoid possible risks of crack formation and other untightnesses in one or some of the individual material layers of the packaging laminate 10, in particular in an aluminium foil serving as gas barrier 14—which is extremely sensitive to tensile stresses and therefore readily cracks when it is subjected to powerful tensile stresses—the layer 15 between the outer, liquid-tight coating 12 of the packaging laminate 10 and the gas barrier 14 preferably consists of a binder or adhesive whose bonding strength to the two surrounding layers increases when the packaging laminate 10 is subjected to a heat treatment in, for example, a retort. In other words, the bonding strength between the outer coating 12 and the aluminium foil 14 in the packaging laminate 10 should initially be sufficiently low or only partial so as to permit a certain "floating" of the tensile stress-sensitive aluminium foil 14 on reforming of the packaging laminate 10 into a packaging container. By a later heat treatment of the packaging container, the bonding strength is thus increased, whereby the packaging container is reliably permanented in its final, conveniently handleable geometric configuration.

Suitable bonding agents for employment in the packaging laminate 10 according to the present invention are per se known in the art, but one particularly preferred bonding agent is, according to the present invention, that which is obtainable from Mitsui, Japan, under the commercial brand name Admer.

Figure 2:
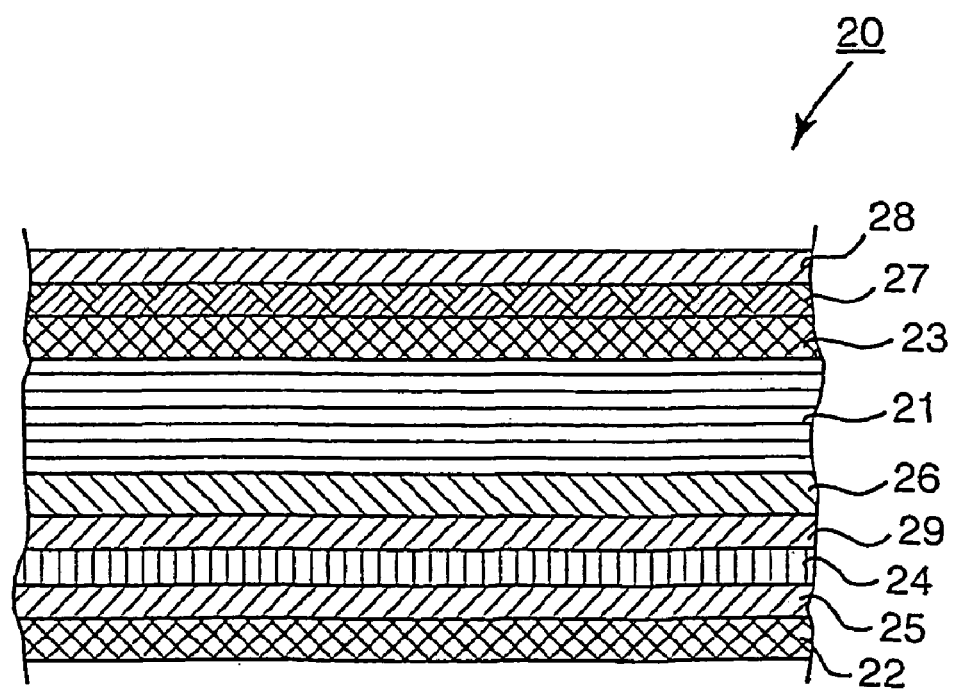
FIG. 2 shows a schematic cross section of a packaging laminate according a second preferred embodiment of the present invention.

FIG. 2 shows a schematic cross section of the packaging laminate according to a second preferred embodiment of the present invention. The packaging laminate, carrying the generic reference numeral 20, has a core layer 21 and outer, liquid-tight coatings 22 and 23 on both sides of the core layer 21.

The packaging laminate 20 further has a gas barrier 24 between the core layer 21 and the one liquid-tight coating 22.

Between the liquid-tight coating 22 and the gas barrier 24, there is disposed a layer 25 of a binder or adhesive by means of which the liquid-tight coating 22 is partially, but reinforceably, bonded to the gas barrier 24, as will be explained in greater detail later in this description.

Between the gas barrier 24 and the core layer 21, there is disposed a layer 26 of lamination or sealing agent of such a nature that the gas barrier 24 is bonded to the core layer 21 with sufficiently strong and stable bonding strength in order not to be weakened or lost entirely when the packaging laminate 20 is subjected to extremely high thermal stresses, i.e. temperatures of up to approx. 130° C. or even higher.

The outer, liquid-tight coating 23 on the other side of the core layer 21 may carry decorative artwork 27 of suitable printing ink which in turn is protected by a transparent layer 28 of a suitable lacquer or other agent disposed above the decorative artwork 27 in order to protect the artwork 27 against outer harmful action.

In order to impart to the packaging laminate 20 further structural integrity, there is disposed, between the gas barrier 24 and the layer 26 of lamination or sealing agent, a layer 29 of a binder or adhesive by means of which the gas barrier 24 is partially, but reinforceably, bonded to the layer 26 of lamination or sealing agent, as will be explained later in this description.

The core layer 21 may consist of any suitably rigid but foldable material whatever, but preferably consists of paper or paperboard of conventional packaging quality.

The outer, liquid-tight coating 23 may be a plastic which is selected from among the group essentially comprising polyethylene (PE), polypropylene (PP) and polyester (PET), or mixtures thereof. Examples of a usable polyethylene plastic may be high density polyethylene (HD PE), or linear low density polyethylene (LLDPE), an example of a usable polypropylene plastic may be oriented polypropylene (OPP), and an example of a usable polyester plastic may be amorphous polyester (APET).

Preferably, the liquid-tight coating 23 consists of a physical or mechanical mixture of polypropylene (PP) and polyethylene (PE) which, in addition to superior tightness properties against liquid, also possesses sufficient humidity and heat resistance to withstand such extreme humidity and temperature stresses which occur in a normal shelf life extending heat treatment in a retort. An outer coating 23 of a physical or mechanical mixture of polypropylene (PP) and polyethylene (PE) moreover possesses good printability at the same time as making for mechanically strong and liquid-tight seals by so-called thermosealing, when the packaging laminate 20 is reformed into a packaging container for retorting purposes.

The thickness or quantity of the outer, liquid-tight coating 23 may vary, but in general is 25–45 g/m$^2$.

Correspondingly, the outer, liquid-tight coating 22 may consist of a plastic which is selected from among the group essentially comprising polyethylene (PE), polypropylene (PP), polyester (PET), and copolymers thereof. Examples of a usable polyethylene plastic may be a high density polyethylene (HDPE), or a linear low density polyethylene (LLDPE), and an example of a usable polyester plastic may be amorphous polyester (APET).

Preferably, the liquid-tight coating 22 consists of a copolymer of propylene and ethylene which is sufficiently humidity and heat resistant to withstand extreme humidity and temperature stresses which occur in a normal shelf life extending heat treatment in a retort. A coating of a copolymer of propylene and ethylene moreover makes for mechanically strong and liquid-tight seals when the packaging laminate 20 is reformed into a packaging container for retorting purposes.

The thickness or quantity of the outer plastic coating 22 may vary, but in general is 25–35 g/m$^2$.

The layer 24 serving as gas barrier may consist of an inorganic or an organic material. Examples of a usable inorganic material may be a metal foil, e.g. an aluminium foil, or a coating, produced by plasma deposition, of silica oxide, and examples of a suitable organic material may be a so-called barrier polymer, e.g. a copolymer of ethylene and vinyl alcohol (EVOH).

Preferably, the gas barrier 24 is an aluminium foil (Ali-foil) which, in addition to superior tightness properties against gases, in particular oxygen gas, also makes for sealing of the packaging laminate 20 by induction thermo-sealing which is a simple, but rapid and efficient sealing technology.

While a packaging container of the prior art packaging laminate, as was previously mentioned, not seldom loses mechanical strength and configurational stability as well as other desired properties in an extreme heat treatment in a retort, this problem may be efficiently obviated with the aid of the packaging laminate 20 according to the present invention by a suitable selection of lamination or sealing layer 26 between the gas barrier 24 and the core layer 21. In particular, it has proved that a layer 26 of a lamination or sealing agent with a melting point which is higher than the treatment temperatures normally employed in connection with such a heat treatment effectively eliminates every risk of weakened bonding strength and later delamination between these two layers, even when the treatment is carried out at an extremely elevated treatment temperature and/or during an excessively long treatment time in a retort. The layer 26 between the gas barrier 24 and the core layer 21 therefore preferably consists of a lamination or sealing agent with a melting point of above 130° C.

The thickness or coating quantity of the lamination or sealing layer 26 may vary, but generally lies within the range of approx. 15–30 g/m$^2$, preferably approx. 20–25 g/m$^2$.

An example of a well-functioning lamination or sealing agent for the layer 26 is polypropylene, preferably a polypropylene with a melting point of above 130° C.

In order to avoid possible risks of crack formation and other untightnesses in one or some of the individual material layers of the packaging laminate 20, in particular in an aluminium foil serving as gas barrier 24—which is extremely sensitive to tensile stresses and therefore readily cracks when it is subjected to powerful tensile stresses—the layer 25 between the outer, liquid-tight coating 22 and the gas barrier 24, as well as also the layer 29 between the gas barrier 24 and the core layer 21, preferably consist of a binder or adhesive whose bonding strength to the two surrounding layers increases when the packaging laminate 20 is subjected to a heat treatment in, for example, a retort. In other words, the bonding should initially be sufficiently low or only partial so as to permit a certain "floating" of the tensile stress-sensitive aluminium foil 24 on reforming of the packaging laminate 20 into a packaging container. By a later heat treatment of the packaging container, the bonding strength is thus increased, whereby the packaging container is reliably permanented in its final, conveniently handleable geometric configuration.

Suitable bonding agents for employment in both of the above-mentioned binder layers 25 and 29 of the packaging laminate are per se known in the art, but one particularly preferred bonding agent is, according to the present invention, that which is obtainable from Mitsui, Japan, under the commercial brand name Admer.

From a packaging laminate according to the present invention, well-functioning retortable packaging containers or cartons can be produced by fold forming and sealing in the above-described manner, these packaging containers reliably allowing heat treatment at extremely high humidity and temperature conditions in a retort, without the packaging laminate delaminating or being destroyed in any other way.

What is claimed is:

1. A packaging laminate for a retortable packaging container, comprising a core layer, outer, liquid-tight coatings and a gas barrier disposed between the core layer and one outer liquid-tight coating, wherein the gas barrier is bonded to the core layer by a layer of a lamination or sealing agent which has a higher melting point than a maximum temperature to which the retortable packaging container is to be subjected during a heat treatment in a retort, and wherein the core layer is a paper or paperboard layer, wherein the lamination or sealing agent is a polypropylene with a melting point of above 130° C.

2. The packaging laminate as claimed in claim 1, wherein a thickness or coating quantity of the lamination or sealing agent is approx. 15–30 g/m$^2$.

3. The packaging laminate as claimed in claim 1, wherein the one outer liquid-tight coating is bonded to the gas barrier via a layer of a binder by means of which the liquid-tight coating is partially, but reinforceably, bonded to the gas barrier.

4. The packaging laminate as claimed in claim 3, wherein the binder in the layer has a bonding strength to respective surrounding layers which increases when the packaging laminate is subjected to heat treatment.

5. The packaging laminate as claimed in claim 3, wherein the gas barrier is bonded to the lamination or sealing layer via a layer of a binder by means of which the gas barrier is partially, but reinforceably, bonded to this lamination or sealing layer.

6. The packaging laminate as claimed in claim 1, wherein the gas barrier is an aluminium foil.

7. A retortable packaging container, which is produced by fold forming and sealing of a packaging laminate as claimed in claim 1.

8. The packaging laminate as claimed in claim 2, wherein the thickness or coating quantity of the lamination or sealing agent is approximately 20–25 g/m$^2$.

* * * * *